United States Patent
Suk et al.

(10) Patent No.: US 11,634,527 B2
(45) Date of Patent: Apr. 25, 2023

(54) METHOD OF PREPARING VINYL CYANIDE COMPOUND-CONJUGATED DIENE COMPOUND-AROMATIC VINYL COMPOUND GRAFT COPOLYMER, AND THERMOPLASTIC RESIN COMPOSITION INCLUDING GRAFT COPOLYMER

(71) Applicant: LG CHEM, LTD., Seoul (KR)

(72) Inventors: Jae Min Suk, Daejeon (KR); Yoo Vin Kim, Daejeon (KR); Young Min Kim, Daejeon (KR); Jin Hyoung Lee, Daejeon (KR); Sujeong Han, Daejeon (KR); Young Hwan Jeong, Daejeon (KR); Changhong Park, Daejeon (KR); Jaewon Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 352 days.

(21) Appl. No.: 16/954,132

(22) PCT Filed: Oct. 21, 2019

(86) PCT No.: PCT/KR2019/013802
§ 371 (c)(1),
(2) Date: Jun. 15, 2020

(87) PCT Pub. No.: WO2020/122407
PCT Pub. Date: Jun. 18, 2020

(65) Prior Publication Data
US 2021/0230334 A1    Jul. 29, 2021

(30) Foreign Application Priority Data

Dec. 14, 2018  (KR) .......... 10-2018-0161808
Oct. 17, 2019  (KR) .......... 10-2019-0129090

(51) Int. Cl.
C08F 279/04    (2006.01)
C08L 55/02    (2006.01)
C08L 51/04    (2006.01)

(52) U.S. Cl.
CPC ............ *C08F 279/04* (2013.01); *C08L 55/02* (2013.01)

(58) Field of Classification Search
CPC ......... C08L 55/02; C08L 51/04; C08F 279/04
USPC ...................................................... 524/504
See application file for complete search history.

(56) References Cited

U.S. PATENT DOCUMENTS 4,399,273 A    8/1983    Humme et al.
5,514,772 A    5/1996    Suzuki et al.

FOREIGN PATENT DOCUMENTS

| CN | 1309675 A | 8/2001 | |
|---|---|---|---|
| CN | 108368210 A | 8/2018 | |
| CN | 109476777 A | 3/2019 | |
| EP | 3231821 A1 | 10/2017 | |
| EP | 3385292 A1 * | 10/2018 | ............ B29C 45/00 |
| EP | 3385292 A1 | 10/2018 | |
| JP | 1985088007 A | 5/1985 | |
| KR | 930012958 A | 7/1993 | |
| KR | 19990017231 A | 3/1999 | |
| KR | 10-2002-0054691 A | 7/2002 | |
| KR | 100463482 B1 | 12/2004 | |
| KR | 10-2008-0017640 A | 2/2008 | |
| KR | 20090079372 A | 7/2009 | |
| KR | 10-2010-0062399 A | 6/2010 | |
| KR | 10-20130033175 A | 4/2013 | |
| KR | 10-2017-0066106 A | 6/2017 | |
| KR | 20180051839 A | 5/2018 | |
| WO | WO0238641 A1 | 5/2002 | |
| WO | WO-0238641 A1 * | 5/2002 | ............ C08F 279/02 |

OTHER PUBLICATIONS

Search Report dated Nov. 30, 2020 for European Application No. 19880937.8.

* cited by examiner

*Primary Examiner* — Ling Siu Choi
*Assistant Examiner* — Ronald Grinsted

(57) ABSTRACT

A method of preparing a graft copolymer includes a step of performing coagulation by adding an acid coagulant to 100 parts by weight (based on solids) of graft copolymer latex prepared by graft-polymerizing an aromatic vinyl compound and a vinyl cyanide compound onto conjugated diene rubber latex; and a step of performing coagulation once more by adding a salt coagulant thereto. In a resulting graft copolymer, coagulation efficiency may be improved and the gloss of the prepared graft copolymer may be increased. In addition, since a b-value measured using a Hunter lab colorimeter and a b-value measured after being left at 250° C. for 15 minutes are low, the graft copolymer may have excellent color characteristics. In addition, since heating loss is low and scorch time is long, the graft copolymer may have excellent processing characteristics.

13 Claims, No Drawings

METHOD OF PREPARING VINYL CYANIDE COMPOUND-CONJUGATED DIENE COMPOUND-AROMATIC VINYL COMPOUND GRAFT COPOLYMER, AND THERMOPLASTIC RESIN COMPOSITION INCLUDING GRAFT COPOLYMER

CROSS-REFERENCE TO RELATED APPLICATIONS

This application is a National Phase of International Application No. PCT/KR2019/013802, filed on Oct. 21, 2019, which claims priority to Korean Patent Application No. 10-2018-0161808, filed on Dec. 14, 2018, and Korean Patent Application No. 10-2019-0129090, re-filed on Oct. 17, 2019, based on the priority of the above patent, in the Korean Intellectual Property Office, the disclosures of each of which are incorporated herein by reference.

TECHNICAL FIELD

The present invention relates to a method of preparing a graft copolymer and a thermoplastic resin composition including the same. According to the method of the present invention, graft copolymer latex prepared by graft-polymerizing an aromatic vinyl compound and a vinyl cyanide compound onto conjugated diene rubber latex is coagulated using an acid coagulant, and then the graft copolymer latex is coagulated once more using a salt coagulant. Accordingly, coagulation efficiency may be improved, and a graft copolymer having excellent gloss, color properties, and processability and a thermoplastic resin composition including the graft copolymer may be provided.

BACKGROUND ART

Acrylonitrile-butadiene-styrene copolymers (hereinafter referred to as "ABS copolymers") represented by vinyl cyanide compound-conjugated diene compound-aromatic vinyl compound graft copolymers have good physical properties such as impact resistance, mechanical strength, moldability, and gloss, and thus are widely used in various fields such as electric parts, electronic parts, office equipment, and automobile parts.

In general, compared to ABS copolymers prepared using bulk polymerization, ABS copolymers prepared by grafting aromatic vinyl compound monomers and vinyl cyanide compound monomers onto conjugated diene rubber latex using emulsion polymerization exhibit a good balance in physical properties and have excellent gloss. Thus, emulsion polymerization is mainly used to prepare ABS copolymers.

In addition, for reduction in volume, improvement in applicability, and ease of handling, ABS copolymer latex prepared using emulsion polymerization is preferably formed in a powder form. According to a conventional method, ABS resin powder may be obtained by coagulating, aging, dehydrating, and drying ABS resin latex.

When coagulation of ABS copolymer latex prepared using emulsion polymerization is performed, various coagulants may be used to chemically coagulate latex particles stabilized by an emulsifier used in emulsion polymerization. In this case, an acid or a metal salt may be used as the coagulant. When an acid is used to coagulate latex, the residual amount of the acid may lower the thermal stability of an ABS resin, and the amount of gas generated during a thermoforming process may be increased, thereby increasing the yellowness index of the resin. In addition, when a metal salt is used to coagulate latex, the amount of gas generated and yellowness index are relatively low, but productivity may be reduced.

Therefore, there is a need to develop an ABS copolymer preparation method that allows efficient coagulation of ABS copolymer latex and preparation of an ABS copolymer having excellent color characteristics.

RELATED ART DOCUMENTS

[Patent Documents] (Patent Document 1) KR 10-0463482 B1

DISCLOSURE

Technical Problem

Therefore, the present invention has been made in view of the above problems, and it is one object of the present invention to provide a method of preparing a graft copolymer, the method including a first coagulation step of performing coagulation by adding 0.10 to 0.80 parts by weight of an acid coagulant based on 100 parts by weight (based on solids) of graft copolymer latex prepared by graft-polymerizing an aromatic vinyl compound and a vinyl cyanide compound onto conjugated diene rubber latex; and a second coagulation step of performing coagulation by adding 0.96 to 1.85 parts by weight of a salt coagulant after the first coagulation step, wherein the total weight of the acid coagulant and the salt coagulant is adjusted to 1.66 to 2.20 parts by weight. According to the present invention, coagulation efficiency and gloss may be improved. In addition, considering the measurement results that a b-value measured using a Hunter lab colorimeter and a b-value measured after being left in an injection molding machine at 250° C. for 15 minutes are low, the graft copolymer has excellent color characteristics. In addition, considering the measurement results that heating loss is low and scorch time is long, the graft copolymer has excellent processing characteristics.

The above and other objects of the present invention may be achieved by the present invention described below.

Technical Solution

In accordance with one aspect of the present invention, provided is a method of preparing a vinyl cyanide compound-conjugated diene compound-aromatic vinyl compound graft copolymer, the method including preparing graft copolymer latex by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight; a first coagulation step of performing coagulation by adding 0.10 to 0.80 parts by weight of an acid coagulant based on 100 parts by weight (based on solids) of the graft copolymer latex; and a second coagulation step of performing coagulation by adding 0.96 to 1.85 parts by weight of a salt coagulant after the first coagulation step, wherein a total weight of the acid coagulant and the salt coagulant is 1.66 to 2.20 parts by weight.

In accordance with another aspect of the present invention, provided is a vinyl cyanide compound-conjugated diene compound-aromatic vinyl compound graft copolymer prepared using the method.

In accordance with yet another aspect of the present invention, provided is a thermoplastic resin composition including 20 to 40% by weight of the vinyl cyanide compound-conjugated diene compound-aromatic vinyl compound graft copolymer and 60 to 80% by weight of an aromatic vinyl compound-vinyl cyanide compound copolymer.

Advantageous Effects

According to the present invention, when graft copolymer latex prepared by graft-polymerizing an aromatic vinyl compound and a vinyl cyanide compound onto conjugated diene rubber latex is coagulated using 0.10 to 0.80 parts by weight of an acid coagulant, and then the graft copolymer latex is coagulated once more using 0.96 to 1.85 parts by weight of a salt coagulant, and when the total weight of the acid coagulant and the salt coagulant is 1.66 to 2.20 parts by weight, coagulation efficiency and gloss can be improved. In addition, considering the measurement results that a b-value measured using a Hunter lab colorimeter and a b-value measured after being left at 250° C. for 15 minutes are low, the graft copolymer of the present invention has excellent color characteristics. In addition, considering the measurement results that heating loss is low and scorch time is long, the graft copolymer has excellent processing characteristics.

BEST MODE

The present inventors confirmed that, when vinyl cyanide compound-conjugated diene compound-aromatic vinyl compound graft copolymer latex was coagulated using an acid coagulant and once more using a salt coagulant under the conditions that the acid coagulant and the salt coagulant were used in specific contents, gloss, color properties, and processability were improved. Based on these results, the present inventors further studied to complete the present invention.

Hereinafter, a method of preparing a vinyl cyanide compound-conjugated diene compound-aromatic vinyl compound graft copolymer according to the present invention will be described in detail.

The method of preparing a vinyl cyanide compound-conjugated diene compound-aromatic vinyl compound graft copolymer according to the present invention includes a step of preparing graft copolymer latex by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight; a first coagulation step of performing coagulation by adding 0.10 to 0.80 parts by weight of an acid coagulant based on 100 parts by weight (based on solids) of the prepared graft copolymer latex; and a second coagulation step of performing coagulation by adding 0.96 to 1.85 parts by weight of a salt coagulant after the first coagulation step. In this case, the total weight of the acid coagulant and the salt coagulant is 1.66 to 2.20 parts by weight. According to the method of the present invention, coagulation efficiency is improved. In addition, since a b-value measured using a Hunter lab colorimeter and a b-value measured after being left at 250° C. for 15 minutes are low and gloss is high, color characteristics are excellent.

The preparation method of the present invention will be described in detail stepwise.

Step of Preparing Conjugated Diene Rubber Latex

For example, a method of preparing conjugated diene rubber latex may include a step of preparing conjugated diene rubber latex by adding 30 to 100 parts by weight of deionized water, 0.5 to 3 parts by weight of an emulsifier, 0.01 to 0.5 parts by weight of an electrolyte, 0.1 to 0.5 parts by weight of a molecular weight modifier, and 0.1 to 1 part by weight of an initiator to 100 parts by weight of a conjugated diene compound and performing polymerization. In this case, impact resistance may be excellent.

As another example, the method of preparing conjugated diene rubber latex may include a step of preparing conjugated diene rubber latex by adding 40 to 70 parts by weight of deionized water, 1 to 2.5 parts by weight of an emulsifier, 0.05 to 0.3 parts by weight of an electrolyte, 0.2 to 0.4 parts by weight of a molecular weight modifier, and 0.3 to 0.8 parts by weight of an initiator to 100 parts by weight of a conjugated diene compound and performing polymerization. In this case, impact resistance may be excellent.

As a specific example, the method of preparing conjugated diene rubber latex may include a first polymerization step of adding 30 to 100 parts by weight of deionized water, 0.3 to 2 parts by weight of an emulsifier, 0.01 to 0.5 parts by weight of an electrolyte, 0.1 to 0.5 parts by weight of a molecular weight modifier, and 0.05 to 0.5 parts by weight of an initiator to 75 to 90 parts by weight of 100 parts by weight of a conjugated diene compound and performing polymerization; a second polymerization step of, when a polymerization conversion rate reaches 35 to 45% after the first polymerization step, adding 0.05 to 0.5 parts by weight of an initiator, continuously feeding 10 to 25 parts by weight of the conjugated diene compound, and performing polymerization; a third polymerization step of, when a polymerization conversion rate reaches 70 to 80% after the second polymerization, adding 0.2 to 1 part by weight of an emulsifier and performing polymerization; and a step of terminating polymerization when a polymerization conversion rate reaches 93 to 99% after the third polymerization. In this case, impact resistance may be excellent.

In the present invention, the polymerization conversion rate may be defined as the weight percentage of a monomer converted into a polymer based on 100% in total of the monomer added until the end of polymerization. Any polymerization conversion rate measurement method performed according to this definition may be used as the polymerization conversion rate measurement method of the present invention without limitation. As a specific example, 1.5 g of prepared latex is dried for 15 minutes in a hot air dryer at 150° C., the weight thereof is measured, total solids content (TSC) thereof is calculated using Equation 1 below, and a polymerization conversion rate is calculated by substituting the total solids content into Equation 2 below. In Equation 2, the total weight of monomers added is set to 100 parts by weight.

Total solids content (TSC, %)=(Weight after drying/weight before drying)×100     [Equation 1]

Polymerization conversion rate (%)=[Total solids content (TSC)×(Total weight of a monomer, deionized water, and subsidiary raw materials, which are added)/100]−(Weight of added subsidiary raw materials except for a monomer and deionized water)     [Equation 2]

In Equation 2, the subsidiary raw materials include initiators, emulsifiers, electrolytes, and molecular weight modifiers.

The added monomer refers to a conjugated diene compound.

For example, the conjugated diene compound may include one or more selected from the group consisting of 1,3-butadiene, 2,3-dimethyl-1,3-butadiene, 2-ethyl-1,3-butadiene, 1,3-pentadiene, and isoprene.

For example, the emulsifier may include one or more selected from the group consisting of alkyl aryl sulfonates, alkali methyl alkyl sulfates, sulfonated alkyl esters, fatty acid soaps, and alkaline salts of rosin acid.

For example, the electrolyte may include one or more selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$, K$_2$HPO$_4$, and Na$_2$HPO$_4$.

For example, water-soluble persulfate polymerization initiators, fat-soluble polymerization initiators, redox system catalysts, and the like may be used as the initiator. For example, the water-soluble persulfate polymerization initiators may include one or more selected from the group consisting of potassium persulfate, sodium persulfate, and ammonium persulfate; the fat-soluble polymerization initiators may include one or more selected from the group consisting of cumene hydroperoxide, diisopropyl benzene hydroperoxide, azobisisobutyronitrile, t-butyl hydroperoxide, paramethane hydroperoxide, and benzoyl peroxide; and the redox system catalysts may include one or more selected from the group consisting of sodium formaldehyde sulfoxylate, sodium ethylenediaminetetraacetate, ferrous sulfate, dextrose, sodium pyrrolate, and sodium sulfite.

Most preferably, when the conjugated diene rubber latex is prepared, potassium persulfate is used as the initiator.

For example, mercaptan-based molecular weight modifiers may be used as the molecular weight modifier. Preferably, tertiary dodecyl mercaptan is used as the molecular weight modifier.

For example, the conjugated diene rubber latex of the present invention may have an average particle diameter of 1,800 to 5,000 Å, preferably 2,000 to 4,000 Å, more preferably 2,500 to 3,500 Å. Within this range, impact resistance may be excellent.

In the present invention, a sample for measuring average particle diameter may be prepared by diluting conjugated diene rubber latex so that the conjugated diene rubber latex has a total solids content (TSC) of 1% or less, and the average particle diameter of the conjugated diene rubber latex may be measured using Nicomp™ 380 instrument (PSS Nicomp Co., USA) according to a dynamic laser light scattering method.

Step of Preparing Graft Copolymer Latex

For example, in the step of preparing the graft copolymer latex, 20 to 40% by weight of an aromatic vinyl compound and 1 to 20% by weight of a vinyl cyanide compound may be graft-polymerized onto 50 to 70% by weight of conjugated diene rubber latex having a solids content of 30 to 65% by weight. Preferably, 25 to 35% by weight of an aromatic vinyl compound and 5 to 15% by weight of a vinyl cyanide compound are graft-polymerized onto 55 to 65% by weight of conjugated diene rubber latex having a solids content of 30 to 65% by weight. Within this range, impact resistance, mechanical strength, and moldability may be excellent.

In the present invention, solids content is defined as the amount of active ingredients remaining when all moisture present in latex are evaporated. When solids content is measured, latex is placed on an aluminum dish, 2.5 g of latex is prepared using a scale, and the prepared latex is held at 150° C. for 5 minutes so that all moisture in the latex is evaporated. Then, the weight of the latex powder is measured, and the measured value is substituted into Equation 3 to calculate the solids content of the latex.

Solids content (% by weight)=100−[(Weight of latex before evaporating moisture (g)−weight of powder remaining after evaporating moisture (g))/weight of latex before evaporating moisture (g)×100]    [Equation 3]

For example, in the step of preparing the graft copolymer latex, 70 to 200 parts by weight of deionized water, 0.1 to 2 parts by weight of an initiator, 0.1 to 2 parts by weight of an emulsifier, and 0.05 to 1.5 parts by weight of a molecular weight modifier may be added to 100 parts by weight in total of the conjugated diene rubber latex, the aromatic vinyl compound, and the vinyl cyanide compound to perform polymerization, and polymerization may be terminated at a polymerization conversion rate of 93 to 99% by weight.

In this step, the polymerization conversion rate is defined to be the same as the polymerization conversion rate described in the step of preparing the conjugated diene rubber latex, and is measured using the same measurement method as the step of preparing the conjugated diene rubber latex. The added monomers are a conjugated diene compound, aromatic vinyl compound, and vinyl cyanide compound included in rubber latex.

As another example, in the step of preparing the graft copolymer latex, 100 to 170 parts by weight of deionized water, 0.3 to 1 part by weight of an initiator, 0.5 to 1.5 parts by weight of an emulsifier, and 0.1 to 1.0 part by weight of a molecular weight modifier may be added to 100 parts by weight in total of the conjugated diene rubber latex, the aromatic vinyl compound, and the vinyl cyanide compound to perform polymerization, and polymerization may be terminated at a polymerization conversion rate 95 to 98% by weight.

As a specific example, in the step of preparing the graft copolymer latex, based on 100 parts by weight in total of conjugated diene rubber, an aromatic vinyl compound, and a vinyl cyanide compound, a mixed solution containing 20 to 40% by weight of an aromatic vinyl compound, 1 to 20% by weight of a vinyl cyanide compound, 10 to 50 parts by weight of deionized water, 0.09 to 1.5 parts by weight of an initiator, 0.1 to 2 parts by weight of an emulsifier, and 0.05 to 1.5 parts by weight of a molecular weight modifier, which are mixed in a separate mixing apparatus, is added to 50 to 70% by weight of conjugated diene rubber latex having a solids content of 30 to 65% by weight and 60 to 150 parts by weight of deionized water at 65 to 75° C. for 2 to 4 hours; 0.01 to 0.5 parts by weight of an initiator is added thereto; heating is performed so that temperature is increased to 75 to 80° C. over 30 to 90 minutes; and graft polymerization is terminated when a polymerization conversion rate reaches 93 to 99% by weight. In this case, impact resistance, mechanical strength, and moldability may be excellent.

For example, the conjugated diene rubber latex may have a solids content of 30 to 65% by weight, preferably 40 to 60% by weight, more preferably 55 to 60% by weight. In this case, polymerization may proceed uniformly.

For example, the aromatic vinyl compound may include one or more selected from the group consisting of styrene, α-methyl styrene, o-methyl styrene, ρ-methyl styrene, m-methyl styrene, ethyl styrene, isobutyl styrene, t-butyl styrene, o-bromo styrene, ρ-bromo styrene, m-bromo styrene, o-chloro styrene, ρ-chloro styrene, m-chloro styrene, vinyltoluene, vinylxylene, fluorostyrene, and vinylnaphthalene.

For example, the vinyl cyanide compound may be acrylonitrile, methacrylonitrile, or a mixture thereof.

For example, the emulsifier, the initiator, and the molecular weight modifier may be used in amounts within the ranges described in the step of preparing the conjugated diene rubber latex.

According to the present invention, other additives such as electrolytes that are not specifically mentioned in the present invention may be appropriately selected as necessary, and additives commonly used in the preparation of vinyl cyanide compound-conjugated diene compound-aromatic vinyl compound graft copolymer latex may be used without particular limitation.

In addition to the above-described reaction conditions, other reaction conditions, such as reaction time, reaction temperature, pressure, and timing of addition of reactants, commonly used in the art to which the present invention pertains may be appropriately selected and used as necessary, without particular limitation.

Step of Coagulating Graft Copolymer Latex

Graft copolymer slurry is formed by coagulating the prepared graft copolymer latex using a coagulant.

For example, the step of coagulating may include a first coagulation step of performing coagulation by adding 0.10 to 0.80 parts by weight of an acid coagulant based on 100 parts by weight (based on solids) of the prepared graft copolymer latex; and a second coagulation step of performing coagulation by adding 0.96 to 1.85 parts by weight of a salt coagulant after the first coagulation step. In this case, the total weight of the acid coagulant and the salt coagulant may be 1.66 to 2.20 parts by weight. When coagulation is performed in this manner, coagulation efficiency may be improved, and gloss may be increased. In addition, since a b-value measured using a Hunter lab colorimeter and a b-value measured after being left at 250° C. for 15 minutes are low, color characteristics may be excellent. In addition, since heating loss is low and scorch time is long, processing characteristics may be excellent.

For example, the first coagulation step may be a step of adding an acid coagulant to graft copolymer latex at a temperature of 75 to 85° C. and increasing the temperature by 5 to 10° C. over 5 to 35 minutes. Preferably, the first coagulation step is a step of adding an acid coagulant at a temperature of 78 to 82° C. and increasing the temperature by 6 to 8° C. over 10 to 30 minutes. In this case, coagulation may be performed uniformly, and coagulation efficiency may be improved.

For example, in the second coagulation step, a salt coagulant may be added at a temperature of 80 to 95° C., and the temperature may be increased by 5 to 10° C. over 5 to 35 minutes. Preferably, a salt coagulant is added at a temperature of 84 to 90° C., and the temperature is increased by 6 to 8° C. over 10 to 30 minutes. In this case, coagulation may be performed uniformly, and coagulation efficiency may be improved. In addition, aging effect may be obtained.

As a specific example, the temperature when the first coagulation step is completed and the temperature when the second coagulation step is started may be the same.

For example, the first coagulation step and the second coagulation step may be performed at a stirring speed of 5 to 450 rpm or 10 to 400 rpm, preferably 30 to 300 rpm, more preferably 30 to 100 rpm, without being limited thereto. Within this range, productivity and coagulation efficiency may be increased, and physical property balance may be excellent.

For example, when coagulation is performed, based on 100 parts by weight (based on solids) of the graft copolymer latex, the acid coagulant may be used in an amount of 0.10 to 0.80 parts by weight, preferably 0.15 to 0.75 parts by weight, more preferably 0.20 to 0.70 parts by weight, most preferably 0.20 to 0.50 parts by weight or 0.50 to 0.70 parts by weight. Within this range, coagulation efficiency may be improved, and gloss may be increased. In addition, since a b-value measured using a Hunter lab colorimeter and a b-value measured after being left at 250° C. for 15 minutes are low, color characteristics may be excellent. In addition, since heating loss is low and scorch time is long, processing characteristics may be excellent.

For example, when coagulation is performed, based on 100 parts by weight (based on solids) of the graft copolymer latex, the salt coagulant may be used in an amount of 0.96 to 1.85 parts by weight or 0.96 to 1.80 parts by weight, preferably 1.00 to 1.80 parts by weight, more preferably 1.25 to 1.80 parts by weight, most preferably 1.30 to 1.50 parts by weight. Within this range, gloss may be excellent. In addition, since heating loss is low and scorch time is long, processing characteristics may be excellent.

For example, based on 100 parts by weight (based on solids) of the graft copolymer latex, the total weight of the acid coagulant and the salt coagulant may be 1.66 to 2.20 parts by weight or 1.70 to 2.10 parts by weight, preferably 1.70 to 2.00 parts by weight, more preferably 1.75 to 2.00 parts by weight. Within this range, coagulation efficiency may be improved, and gloss may be increased. In addition, since a b-value measured using a Hunter lab colorimeter and a b-value measured after being left at 250° C. for 15 minutes are low, color characteristics may be excellent. In addition, since heating loss is low and scorch time is long, processing characteristics may be excellent.

For example, the acid coagulant may include one or more selected from the group consisting of sulfuric acid, hydrochloric acid, formic acid, and acetic acid. Preferably, the acid coagulant is sulfuric acid. In this case, since a b-value measured using a Hunter lab colorimeter and a b-value measured after being left at 250° C. for 15 minutes are low, color characteristics may be excellent.

For example, the salt coagulant may include one or more selected from the group consisting of magnesium sulfate, calcium sulfate, aluminum sulfate, magnesium chloride, calcium chloride, and aluminum chloride. Preferably, the salt coagulant is magnesium sulfate. In this case, coagulation efficiency may be improved, and gloss may be excellent.

When the acid coagulant and the salt coagulant include a solvent such as water, the weight thereof means a weight excluding the solvent.

For example, in the coagulation step, an antioxidant, a stabilizer, or a mixture thereof may be added. In this case, after extrusion, physical property balance may be excellent.

The coagulated graft copolymer latex may be dehydrated and dried to obtain graft copolymer powder.

In the present invention, powder means an object consisting of a plurality of solid particles. For example, powder may be an object consisting of a plurality of solid particles having an average particle diameter of 1 to 10,000 μm or 10 to 2,000 μm.

In the present invention, the average particle diameter of powder may be measured using a DP caking test. Specifically, according to the DP caking test, 10 g of powder is compressed for 10 minutes using a 20 kg weight, meshes from a #8 mesh (2,380 μm) to a #625 mesh (20 μm) are laminated in a sieve vibrator (Analysette 3, Fritsch Co., Germany), a stainless steel container for collecting powder that passes through the #625 mesh is placed at the bottom of the #625 mesh, vibration is applied to the sieve vibrator for 20 minutes, and the particle size distribution of powder remaining in the mesh is confirmed. In the particle size distribution, the diameter of particles having a cumulative weight of 50% by weight is used as the average particle diameter of the powder.

Dehydration and drying methods commonly used in the art may be used in the present invention without particular limitation.

For example, slurry obtained after coagulation may be dehydrated using a centrifugal dehydrator, a press type dehydrator, or the like to obtain a graft copolymer in a wet powder form.

For example, dehydration may be performed at least once, preferably 1 to 3 times, more preferably 2 to 3 times. In this case, the content of a residual emulsifier may be reduced, thereby improving surface characteristics such as gloss.

For example, the graft copolymer in a wet powder form obtained after dehydration may have a moisture content of 40% by weight or less, preferably 10 to 40% by weight, more preferably 10 to 35% by weight or 10 to 30% by weight. In this case, in a drying step, which is a subsequent process, efficiency may be increased, thereby increasing productivity.

Drying processes conventionally practiced in the art to which the present invention pertains may be used in the present invention without particular limitation. For example, a graft copolymer in a wet powder form may be dried by air supplied from a fluidized bed dryer to obtain graft copolymer powder.

In addition, graft copolymer powder obtained by drying a graft copolymer in a wet powder form may have a moisture content of, e.g., 2% by weight or less, preferably 0.1 to 2% by weight, more preferably 0.1 to 1% by weight. Within this range, the productivity of a copolymer may be improved, and physical properties such as mechanical strength, heat resistance, and surface gloss may be excellent.

In the present invention, moisture content may be measured using a moisture analyzer. As a specific example, a moisture analyzer (Mettler Toledo Co., Switzerland) may be used.

For example, the graft copolymer powder and an aromatic vinyl compound-vinyl cyanide compound copolymer may be melt kneaded and extruded. In this case, impact resistance, chemical resistance, moldability, and gloss may be excellent. In addition, since a b-value measured using a Hunter lab colorimeter and a b-value measured after being left at 250° C. for 15 minutes are low, a thermoplastic resin composition with aesthetics may be prepared.

For example, the melt kneading and extruding steps may be performed at 220 to 240° C. and at 250 to 400 rpm, preferably at 225 to 235° C. and at 300 to 400 rpm, without being limited thereto.

For example, melt kneading may be performed using a Banbury mixer, a single-screw extruder, a twin-screw extruder, a kneader, or the like, without being limited thereto.

For example, when melt kneading is performed, one or more additives selected from the group consisting of colorants, heat stabilizers, light stabilizers, reinforcing agents, fillers, flame retardants, lubricants, plasticizers, antistatic agents, and processing aids may be added in an amount of 0.1 to 10 parts by weight or 0.1 to 5 parts by weight.

In addition, the vinyl cyanide compound-conjugated diene compound-aromatic vinyl compound graft copolymer of the present invention is prepared by the above-described preparation method. In this case, since a b-value measured using a Hunter lab colorimeter and a b-value measured after being left at 250° C. for 15 minutes are low and gloss is high, color characteristics may be excellent.

In addition, the thermoplastic resin composition of the present invention includes the vinyl cyanide compound-conjugated diene compound-aromatic vinyl compound graft copolymer in an amount of 20 to 40% by weight, preferably 25 to 35% by weight, and an aromatic vinyl compound-vinyl cyanide compound copolymer in an amount of 60 to 80% by weight, preferably 65 to 75% by weight. In this case, impact resistance, chemical resistance, moldability, and gloss may be excellent. In addition, since a b-value measured using a Hunter lab colorimeter and a b-value measured after being left at 250° C. for 15 minutes are low, aesthetics may be realized.

For example, when a specimen having a thickness of ⅛ inch (3.2 mm) is prepared from the thermoplastic resin composition and gloss of the specimen is measured at an angle of 45° using a gloss meter according to ASTM D523, the thermoplastic resin composition may have a gloss of 90 or more or 90 to 110, preferably 92 to 102, more preferably 96 to 100. Within this range, physical property balance and color characteristics may be excellent.

For example, when a b-value is measured using a Hunter lab colorimeter, the thermoplastic resin composition may have a b-value of 3.6 or less, preferably 3.0 to 3.6, more preferably 3.2 to 3.5. Within this range, physical property balance and color characteristics may be excellent.

For example, when a b-value is measured using a Hunter lab colorimeter after being left at 250° C. for 15 minutes, the thermoplastic resin composition may have a b-value of 9 or less, preferably 3 to 9, more preferably 5 to 9, most preferably 5 to 8. Within this range, physical property balance and color characteristics may be excellent.

For example, when scorch time is measured at 190° C. according to a scorch test, the thermoplastic resin composition may have a scorch time of 60 minutes or more, or 80 minutes or more, preferably 80 to 180 minutes, more preferably 80 to 150 minutes. Within this range, processing characteristics and physical property balance may be excellent.

In the present invention, scorch time is defined as the time when flow stops in a mold and rubber starts to ripen. When scorch time is short, an unvulcanized mixture is vulcanized during molding at high temperature, increasing the incidence of mold failure.

In the present invention, when scorch time is measured, thermoplastic resin composition powder having a moisture content of 1% by weight or less is placed on aluminum foil in contact with oxygen in the air, allowed to stand in a hot air oven at 190° C., and time at which carbonization begins, i.e., scorch time, is measured. Scorch time is proportional to the degree of thermal stability.

In the present invention, moisture content may be measured using a moisture analyzer. As a specific example, a moisture analyzer (Mettler Toledo Co., Switzerland) may be used.

For example, the thermoplastic resin composition may have a heating loss of 0.8% by weight or less, or 0.1 to 0.8% by weight, preferably 0.1 to 0.6% by weight, more preferably 0.4 to 0.6% by weight. Within this range, processing characteristics and physical property balance may be excellent.

In the present invention, heating loss is defined as reduction in weight that occurs when a material is heated under certain conditions. When heating loss is measured, heating is performed under nitrogen atmosphere at a rate of 20° C./minute so that temperature is increased from 80° C. to 250° C., and then heating is continued to maintain a temperature of 250° C. for 60 minutes. Then, the weights of resin before and after heating are measured, and the measured values are substituted into Equation 4 to calculate heating loss. In addition, the weights of resin before and after heating may be measured by thermogravimetric analysis (TGA). Low heating loss means excellent processing characteristics.

$$\text{Heating loss (\% by weight)} = \{(\text{Weight before heating} - \text{weight after heating})/\text{weight before heating}\} \times 100 \qquad \text{[Equation 4]}$$

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

The components used in Examples and Comparative Examples below are as follows.
Acid coagulant: Sulfuric acid
Salt coagulant: Magnesium sulfate
<Preparation of Conjugated Diene Rubber Latex>
55 parts by weight of deionized water, 85 parts by weight of 100 parts by weight of 1,3-butadiene as a monomer, 1.5 parts by weight of a C16 to C18 fatty acid metal salt as an emulsifier, 0.15 parts by weight of potassium carbonate ($K_2CO_3$) as an electrolyte, 0.3 parts by weight of tertiary dodecyl mercaptan (TDDM) as a molecular weight modifier, and 0.3 parts by weight of potassium persulfate as an initiator were added to a nitrogen-substituted polymerization reactor batchwise, and polymerization was performed at 70° C. When a polymerization conversion rate reached 35 to 45%, 0.3 parts by weight of potassium persulfate was added to the reactor batchwise, and the remaining amount of 1,3-butadiene was continuously added. When a polymerization conversion rate reached 70 to 80%, 0.3 parts by weight of a rosin acid saponifying agent was added batchwise. When a polymerization conversion rate reached 93%, polymerization was terminated to prepare conjugated diene rubber latex.

The average particle diameter of the prepared conjugated diene rubber latex was 3,000 Å, and the solids content thereof was 55 to 60% by weight.

<Preparation of Vinyl Cyanide Compound-Conjugated Diene Compound-Aromatic Vinyl Compound Graft Copolymer (Hereinafter Referred to as ABS Graft Copolymer)>

A mixed solution containing 10 parts by weight of acrylonitrile; 30 parts by weight of styrene; 25 parts by weight of deionized water; 0.12 parts by weight of t-butyl hydroperoxide; 0.9 parts by weight of potassium rosinate; and 0.35 parts by weight of tertiary dodecyl mercaptan, which had been mixed in a separate mixing apparatus, 0.054 parts by weight of dextrose, 0.004 parts by weight of sodium pyrrole phosphate, and 0.002 parts by weight of ferrous sulfate were added to a nitrogen-substituted polymerization reactor containing 60 parts by weight of the prepared conjugated diene rubber latex having a solids content of 55 to 60% by weight and 100 parts by weight of deionized water at 70° C. for 3 hours. Thereafter, 0.05 parts by weight of dextrose, 0.03 parts by weight of sodium pyrrole phosphate, 0.001 parts by weight of ferrous sulfate, and 0.05 parts by weight of t-butyl hydroperoxide were added to the polymerization reactor batchwise, and heating was performed so that temperature was increased to 80° C. over 1 hour. Then, the reaction was terminated to prepare ABS graft copolymer latex. At this time, a polymerization conversion rate was 97%.

Example 1

0.20 parts by weight of sulfuric acid was added to 100 parts by weight (based on solids) of the prepared ABS graft copolymer latex at 80° C., and the temperature was increased to 87° C. over 20 minutes to perform coagulation (a first coagulation step). Then, 1.80 parts by weight of magnesium sulfate was added thereto at 87° C., and the temperature was increased to 93° C. over 15 minutes to perform coagulation (a second coagulation step). The coagulated ABS graft copolymer was dehydrated and dried to prepare ABS graft copolymer powder. 27 parts by weight of the prepared ABS graft copolymer powder and 73 parts by weight of an acrylonitrile-styrene copolymer (92HR, LG Chemical Co., Ltd) were added to a mixer and mixed. Then, melt kneading was performed at 210° C. using an extruder to perform pelletization, and specimens for measuring physical properties were prepared using an injection molding machine.

Examples 2 to 6

Examples 2 to 6 were performed in the same manner as in Example 1, except that the contents of sulfuric acid and magnesium sulfate were changed as shown in Table 1 below.

Comparative Example 1

2.0 parts by weight of sulfuric acid was added to 100 parts by weight (based on solids) of the prepared ABS graft copolymer latex at 80° C., and the temperature was increased to 93° C. over 30 minutes to perform coagulation and aging. Then, the coagulated and aged ABS graft copolymer was dehydrated and dried to prepare ABS graft copolymer powder. 27 parts by weight of the prepared ABS graft copolymer powder and 73 parts by weight of an acrylonitrile-styrene copolymer (92HR, LG Chemical Co., Ltd) were added to a mixer and mixed. Then, melt kneading was performed at 210° C. using an extruder to perform pelletization, and specimens for measuring physical properties were prepared using an injection molding machine.

Comparative Example 2

Comparative Example 2 was performed in the same manner as in Comparative Example 1, except that 2 parts by weight of magnesium sulfate was added instead of 2 parts by weight of sulfuric acid.

Comparative Example 3

Comparative Example 3 was performed in the same manner as in Comparative Example 1, except that 1 part by weight of sulfuric acid and 1 part by weight of magnesium sulfate were added instead of 2 parts by weight of sulfuric acid.

Comparative Examples 4 to 7

Comparative Examples 4 to 7 were performed in the same manner as in Comparative Example 1, except that the contents of sulfuric acid and magnesium sulfate were changed as shown in Table 2 below.

Comparative Examples 8 to 17

Comparative Examples 8 to 17 were performed in the same manner as in Example 1, except that order of addition of sulfuric acid and magnesium sulfate and the contents of sulfuric acid and magnesium sulfate were changed as shown in Table 3 below.

Test Example

The properties of specimens prepared in Examples 1 to 6 and Comparative Examples 1 to 17 were measured according to the following methods, and the results are shown in Tables 1 to 3.

Measurement Methods

Gloss: Gloss of specimens having a thickness of ⅛ inch (3.2 mm) was measured at 45° according to ASTM D523.

b-value: b-values were measured using a Hunter lab colorimeter.

b-value after being left: After being left in an injection molding machine at 250° C. for 15 minutes, b-values were measured using a Hunter lab colorimeter.

Scorch test (min.): Thermoplastic resin composition powder having a moisture content of 1% by weight or less was placed on aluminum foil in contact with oxygen in the air and allowed to stand in a hot air oven at 190° C. Then, time at which carbonization begun was measured.

Heating loss (% by weight): Heating was performed under nitrogen atmosphere so that temperature was increased from 80° C. to 250° C. at a rate of 20° C./minute, and heating was continued to maintain a temperature of 250° C. for 60 minutes. Then, the weights of resin before and after heating were measured by thermogravimetric analysis (TGA), and heating loss was calculated using Equation 4.

Heating loss (% by weight)={(Weight before heating−weight after heating)/weight before heating}×100    [Equation 4]

TABLE 1

| Classification | Example 1 | Example 2 | Example 3 | Example 4 | Example 5 | Example 6 |
|---|---|---|---|---|---|---|
| Method of adding coagulants | After first coagulant is added, second coagulant is added | | | | | |
| First coagulant (parts by weight) | $H_2SO_4$ 0.2 | $H_2SO_4$ 0.3 | $H_2SO_4$ 0.5 | $H_2SO_4$ 0.7 | $H_2SO_4$ 0.7 | $H_2SO_4$ 0.45 |
| Second coagulant (parts by weight) | $MgSO_4$ 1.8 | $MgSO_4$ 1.7 | $MgSO_4$ 1.5 | $MgSO_4$ 1.3 | $MgSO_4$ 1.0 | $MgSO_4$ 1.4 |
| Total weight of coagulants (parts by weight) | 2.0 | 2.0 | 2.0 | 2.0 | 1.7 | 1.85 |
| b-value | 3.2 | 3.2 | 3.2 | 3.2 | 3.3 | 3.2 |
| b-value after being left | 9 | 9 | 8 | 8 | 8 | 8 |
| Gloss | 97 | 97 | 97 | 97 | 96 | 97 |
| Scorch time (min.) | 80 or more | 80 or more | 80 or more | 80 or more | 80 or more | 80 or more |
| Heating loss (% by weight) | 0.4 | 0.4 | 0.5 | 0.4 | 0.6 | 0.5 |

TABLE 2

| Classification | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Method of adding coagulants | First coagulant and second coagulant are mixed and added | | | | | | |
| First coagulant (parts by weight) | $H_2SO_4$ 2.0 | — | $H_2SO_4$ 1.0 | $H_2SO_4$ 0.5 | $H_2SO_4$ 0.5 | $H_2SO_4$ 0.2 | $H_2SO_4$ 1.0 |
| Second coagulant (parts by weight) | — | $MgSO_4$ 2.0 | $MgSO_4$ 1.0 | $MgSO_4$ 1.5 | $MgSO_4$ 1.0 | $MgSO_4$ 1.0 | $MgSO_4$ 0.2 |
| Total weight of coagulants (parts by weight) | 2 | 2 | 2 | 2 | 1.5 | 1.2 | 1.2 |
| b-value | 6.2 | 3.2 | 4.8 | 3.9 | 4.5 | 3.3 | 4.9 |
| b-value after being left | 8 | 14 | 11 | 13 | 13 | 14 | 9 |
| Gloss | 85 | 95 | 90 | 93 | 90 | 93 | 89 |
| Scorch time (min.) | 80 or more | 15 | 25 | 20 | 24 | 17 | 70 |
| Heating loss (% by weight) | 3.2 | 0.2 | 1.8 | 0.9 | 1.1 | 0.5 | 2.9 |

TABLE 3

| Classification | Comparative Examples | | | | | | | | | |
| | 8 | 9 | 10 | 11 | 12 | 13 | 14 | 15 | 16 | 17 |
|---|---|---|---|---|---|---|---|---|---|---|
| Method of adding coagulants | After first coagulant is added, second coagulant is added | | | | | | | | | |
| First coagulant (parts by weight) | $MgSO_4$ 0.2 | $MgSO_4$ 1.3 | $MgSO_4$ 1.8 | $MgSO_4$ 1.0 | $MgSO_4$ 0.2 | $H_2SO_4$ 0.7 | $H_2SO_4$ 0.2 | $H_2SO_4$ 0.2 | $H_2SO_4$ 0.7 | $H_2SO_4$ 1.3 |
| Second coagulant (parts by weight) | $H_2SO_4$ 1.8 | $H_2SO_4$ 0.7 | $H_2SO_4$ 0.2 | $H_2SO_4$ 0.2 | $H_2SO_4$ 1.0 | $MgSO_4$ 0.9 | $MgSO_4$ 1.9 | $MgSO_4$ 1.0 | $MgSO_4$ 1.8 | $MgSO_4$ 0.7 |
| Total weight of coagulants (parts by weight) | 2.0 | 2.0 | 2.0 | 1.2 | 1.2 | 1.6 | 2.1 | 1.2 | 2.5 | 2.0 |
| b-value | 5.9 | 3.3 | 3.3 | 3.4 | 4.7 | 3.7 | 3.3 | 3.3 | 3.7 | 4.7 |
| b-value after being left | 9 | 11 | 12 | 11 | 9 | 8 | 12 | 12 | 9 | 8 |

TABLE 3-continued

| Classification | Comparative Examples | | | | | | | | | |
| --- | --- | --- | --- | --- | --- | --- | --- | --- | --- | --- |
| | 8 | 9 | 10 | 11 | 12 | 13 | 14 | 15 | 16 | 17 |
| Gloss | 86 | 90 | 93 | 91 | 88 | 89 | 94 | 92 | 89 | 91 |
| Scorch time (min.) | 80 or more | 55 | 25 | 33 | 70 | 80 or more | 40 | 45 | 58 | 80 |
| Heating loss (% by weight) | 3 | 1.0 | 0.4 | 0.5 | 2.2 | 0.9 | 0.4 | 0.4 | 0.9 | 1.6 |

As shown in Tables 1 to 3, in the cases of Examples 1 to 6 according to the present invention, gloss is high, and b-values measured using a Hunter lab colorimeter and b-values measured after being left at 250° C. for 15 minutes are low, indicating that color characteristics are excellent. In addition, scorch time is long, and heating loss is low, indicating that processing characteristics are excellent.

On the other hand, the samples of Comparative Examples 1 and 2, in which an acid coagulant or a salt coagulant is included alone, and the samples of Comparative Examples 3 to 7, in which an acid coagulant and a salt coagulant are mixed and added batchwise, are poor in gloss, b-values measured using a Hunter lab colorimeter, b-values measured after being left at 250° C. for 15 minutes, scorch time, and heating loss.

In addition, the samples of Comparative Examples 8 to 12, in which a salt coagulant is added to perform coagulation, and then an acid coagulant is added, are poor in gloss, b-values measured using a Hunter lab colorimeter, b-values measured after being left at 250° C. for 15 minutes, scorch time, and heating loss.

In addition, the samples of Comparative Examples 13, 15, and 16, in which an acid coagulant is added, and then a salt coagulant is added to perform coagulation, but the total amount of the coagulants is less than or exceeds the predetermined amount of the present invention, and the sample of Comparative Example 14, in which an excess of a salt coagulant is added, are poor in gloss, b-values measured using a Hunter lab colorimeter, b-values measured after being left at 250° C. for 15 minutes, scorch time, and heating loss.

In addition, the sample of Comparative Example 17, in which an excess of an acid coagulant is included, is poor in a b-value measured using a Hunter lab colorimeter and heating loss.

The invention claimed is:

1. A method of preparing a vinyl cyanide compound-conjugated diene compound-aromatic vinyl compound graft copolymer, the method comprising:
   preparing a graft copolymer latex by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight;
   a first coagulation step of performing coagulation by adding 0.10 to 0.80 parts by weight of an acid coagulant based on 100 parts by weight based on total solids of the graft copolymer latex; and
   a second coagulation step of performing coagulation by adding 0.96 to 1.85 parts by weight of a salt coagulant after the first coagulation step,
   wherein a total weight of the acid coagulant and the salt coagulant is 1.66 to 2.20 parts by weight.

2. The method according to claim 1, wherein the acid coagulant comprises one or more selected from the group consisting of sulfuric acid, hydrochloric acid, formic acid, and acetic acid.

3. The method according to claim 1, wherein the salt coagulant comprises one or more selected from the group consisting of magnesium sulfate, calcium sulfate, aluminum sulfate, magnesium chloride, calcium chloride, and aluminum chloride.

4. The method according to claim 1, wherein, in the first coagulation step, the acid coagulant is added at a temperature of 75 to 85° C., and heating is performed so that the temperature is increased by 5 to 10° C. over 5 to 35 minutes.

5. The method according to claim 1, wherein, in the second coagulation step, the salt coagulant is added at a temperature of 80 to 95° C., and heating is performed so that the temperature is increased by 5 to 10° C. over 5 to 35 minutes.

6. The method according to claim 1, wherein, in the preparing, 70 to 200 parts by weight of deionized water, 0.1 to 2 parts by weight of an initiator, 0.1 to 2 parts by weight of an emulsifier, and 0.05 to 1.5 parts by weight of a molecular weight modifier are added to 100 parts by weight in total of the conjugated diene rubber latex, the aromatic vinyl compound, and the vinyl cyanide compound to perform polymerization, and polymerization is terminated at a polymerization conversion rate of 93 to 99% by weight.

7. The method according to claim 1, wherein the preparing of the graft copolymer latex comprises preparing the conjugated diene rubber latex by adding 30 to 100 parts by weight of deionized water, 0.5 to 3 parts by weight of an emulsifier, 0.01 to 0.5 parts by weight of an electrolyte, 0.1 to 0.5 parts by weight of a molecular weight modifier, and 0.1 to 1 part by weight of an initiator to 100 parts by weight of the conjugated diene compound and performing polymerization.

8. The method according to claim 1, comprising dehydration and drying steps after the coagulation steps.

9. A vinyl cyanide compound-conjugated diene compound-aromatic vinyl compound graft copolymer prepared using the method according to claim 1.

10. A thermoplastic resin composition, comprising:
   20 to 40% by weight of the vinyl cyanide compound-conjugated diene compound-aromatic vinyl compound graft copolymer of claim 9; and
   60 to 80% by weight of an aromatic vinyl compound-vinyl cyanide compound copolymer.

11. The thermoplastic resin composition according to claim 10, wherein, when a b-value is measured using a Hunter lab colorimeter after being left at 250° C. for 15 minutes, the thermoplastic resin composition has a b-value of 9 or less.

12. The thermoplastic resin composition according to claim 10, wherein, when gloss is measured at an angle of 45° using a gloss meter according to ASTM D523, the thermoplastic resin composition has a gloss of 90 or more.

13. The thermoplastic resin composition according to claim 10, wherein, when thermoplastic resin composition powder having a moisture content of 1% by weight or less is placed on aluminum foil in contact with oxygen in air, allowed to stand in a hot air oven at 190° C., and a scorch test is performed to measure time at which carbonization begins, the thermoplastic resin composition has a scorch time of 60 minutes or more.

* * * * *